Figure 1:
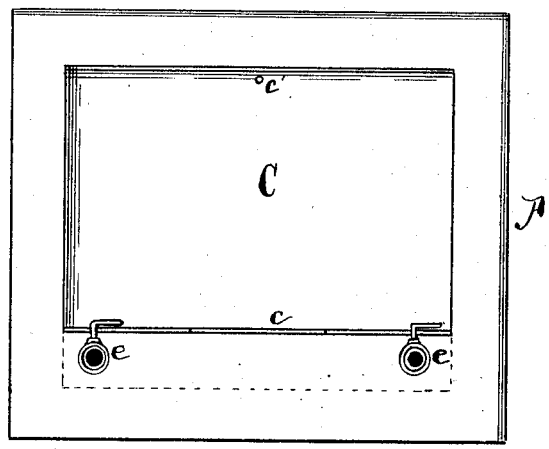

No. 725,520. PATENTED APR. 14, 1903.
F. C. WEBER
METHOD OF REDUCING METALLIC OXIDS WITH METALLIC ALUMINIUM.
APPLICATION FILED AUG. 6, 1902.
NO MODEL.

Witnesses
Samuel W. Banning
Oscar W. Bond

Inventor
Frederick C. Weber
By Banning & Banning
Att'ys.

UNITED STATES PATENT OFFICE.

FREDERICK C. WEBER, OF CHICAGO, ILLINOIS.

METHOD OF REDUCING METALLIC OXIDS WITH METALLIC ALUMINIUM.

SPECIFICATION forming part of Letters Patent No. 725,520, dated April 14, 1903.

Application filed August 6, 1902. Serial No. 118,585. (No specimens.)

*To all whom it may concern:*

Be it known that I, FREDERICK C. WEBER, a citizen of the United States, residing at Chicago, in the county of Cook and State of Illinois, have invented or discovered a certain new and useful Improvement in Methods of Reducing Metallic Oxids with Metallic Aluminium, of which the following is a specification, the same being an improvement on the method of reducing metallic oxids with metallic aluminium of my application, Serial No. 555,990, filed April 15, 1901.

The employment of aluminium and the reducing action thereof for the treatment of metallic oxids in the production of metals and alloys is well known, and various methods have been devised for effecting such reduction; but it has been found in practice that in the reduction of the oxids of metals and of metalloids employing aluminium as the reducing agent the reaction always so occurs that caloric is set free as the resultant effect, the latent caloric of the components of the charge becoming sensibly caloric. It is also true that the resulting metal or chemical molecules formed by the reduction always possesses a lower heat of stability than that possessed by the metallic aluminium, and the sum of this difference between the latent heat of stability and the resulting metal or chemical molecule product causes the reduction to take place either violently or slowly, and this rapid or slow progress of the reaction determines the character of the resulting products.

One of the principal defects which has been found in the treating of metallic oxids with aluminium is the danger of an explosion of the charge, and the cause of the explosion may be either due to the instantaneous reaction or from the presence of a trifle of moisture, which latter is due to and derived from the hygroscopic character of some of the oxids used and which is found present in the shape of water of crystallization and hygroscopic or ordinarily present moisture. The heat produced by these reductions is so intense that all ordinarily present moisture is instantaneously converted into steam, which acts with all the suddenness and power of a high explosive. The successful treatment of metallic oxids with aluminium requires in order to prevent explosions the removal of all hygroscopic or ordinarily present moisture in the mixture before the final treatment by the aluminium, and this removal of the moisture found in the charge constitutes the essential and important step in carrying out the process of my invention, and combined with this step is that of employing for the charge the combination of aluminium and metallic oxids in the form of a very fine powder or in granules of such fineness that the time required for each separated particle or granule to become heated to the temperature where the reaction is initiated shall be approximately uniform and correct, and this temperature varies from 200° Fahrenheit for producing metallic manganese to 300° Fahrenheit and over for producing metallic chromium or the titanium compounds, so that after the reaction is initiated such reaction will progress at just the right speed for perfect reduction, and thereby have the resulting product which it is aimed to obtain correctly produced whether it be a separation of the produced metal from the corundum or the formation of the new chemical molecule and its proper separation from the corundum-slag.

Briefly stated, then, the object of the process of this invention is the removal of all hygroscopic or ordinarily present moisture, thus bringing the charge into a condition for reaction without danger of explosion; and the invention consists in the employment of materials for the charge under conditions hereinafter described and subjected to the action of heat for the removal of all moisture, as hereinafter described and claimed.

In carrying out the method or process of my invention the charge to be treated is composed of finely powdered or comminuted metallic oxid and aluminium mixed together under conditions of chemical equivalents. This charge of oxid and aluminium is to be subjected to a sufficient heat that will remove all moisture, leaving the charge free of moisture and in condition for further treatment for reducing purposes. The heater and drier preferably utilized for the drying-out step of the charge is in the form of a rectangular box having an inner wall or shell and an outer wall or shell, interposed between which walls or shells is a filling of a suitable non-conductor of heat—such as, for instance, asbestos boiler-covering. The heating-chamber is within the interior shell or casing, and this shell or casing, at the bottom thereof, has located therein a coiled steam-pipe, or preferably a plate of type-metal covered by a thick plate of sheet-iron, the type-metal plate having therein a flat coil of brass pipe so closely coiled that the molten type-metal will just fully cover the brass pipe, leaving the ends of the pipe projecting for connection with a steam supply and eduction pipe for passing steam through the coil to fully dry any oxid placed upon the plate within the chamber. The temperature for drying out the material must be high enough to effectually drive off all the moisture contained in the material and at the same time must not be so high as to cause any reaction within the drying-chamber, and a proper temperature would be obtained with steam at one hundred and twenty pounds pressure, which would give a temperature of over 250° Fahrenheit, and with this degree of heat the full drying of the charge is attained, and no reaction is initiated.

The preferred form of heater and drier is shown in the drawings, in which—

Figure 2:
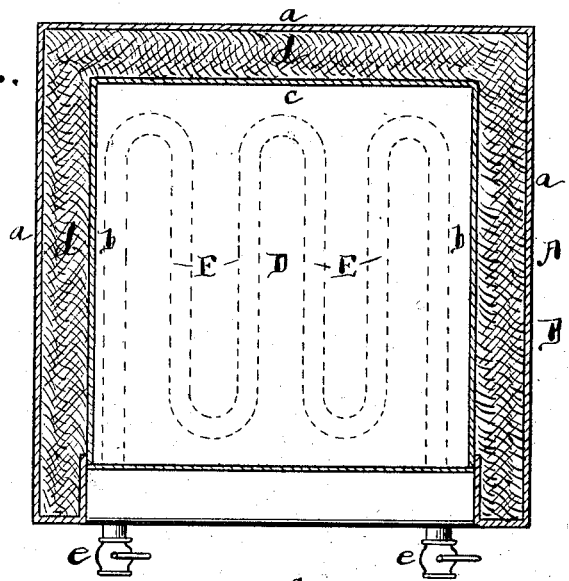
Figure 3:
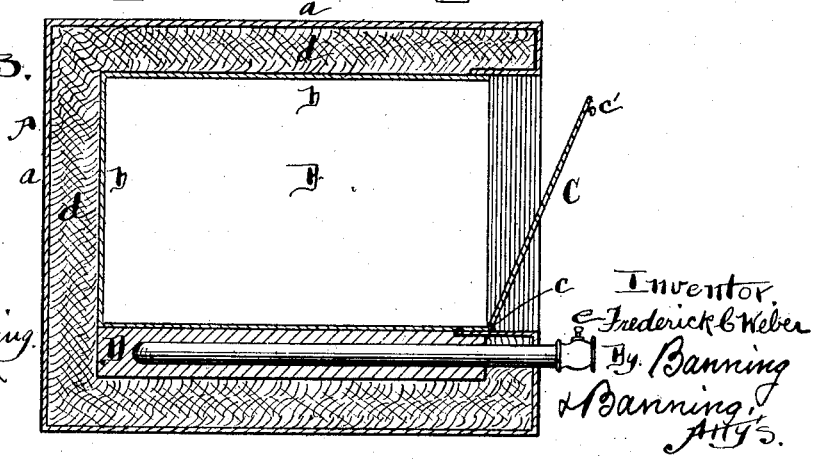

Figure 1 is a front elevation of the heater and drier with the door closed; Fig. 2, a cross-sectional plan view showing the bottom of the drying-chamber provided with a coil of pipe; and Fig. 3, a sectional elevation fore and aft of the heater and drier, showing the door partially open.

The heater and drier has an outer box or casing A and an inner box or casing B, each box or casing preferably made of sheet-iron, though other suitable metal or materials may be used. The space between the wall $a$ of the outer box or casing and the wall $b$ of the inner box or casing is filled with any suitable material that is a non-conductor of heat, which material $d$ wholly incloses the inner box or casing on the top sides and ends and a portion of the front, the front having a door C, hinged at its lower end, as shown, by a suitable hinge $c$, and having a knob or handle $c'$, by means of which the door can be opened to place the material within the chamber of the inner box or casing, and when the material is in place the door is closed, retaining the heat within the chamber. The bottom of the inner box or casing has a plate D, preferably of type-metal, below which is a filling or covering of a non-conductor of heat and over which is a covering of sheet-iron and in which is contained a coil E for the transmission of steam through the coil to heat the chamber of the inner box or casing, and, as shown, the ends of the coil E project beyond the front of the outer box or casing, and each end is provided with a shut-off valve $e$ for controlling the admission and discharge of steam. The material is placed within the chamber of the inner box or casing and the door closed, after which steam is admitted to the coil E for the steam to act and produce the required amount of heat for effectually removing all moisture from the charge. The material placed in the chamber is a mixture of aluminium and the to-be-treated metallic oxids, both of which are required in the form of a fine powder or granules, as is called for in each separate operation of reaction.

The material placed within the chamber of the inner box or casing and treated to the required degree of heat for removing all hygroscopic or ordinarily present moisture is ready, after the drying operation is finished, to be placed in a crucible or other vessel, where it is subjected to further treatment by which the entire charge will be brought to a heat, either by means of an electric current or otherwise, having a sufficient intensity to melt the aluminium for the melted aluminium to react with the finely powdered or granuled oxid or oxids, bringing the entire charge under full reaction, producing in a few moments molten corundum, which makes its appearance on the surface, while a regulus of the metal of the oxid or alloy which is undergoing reaction forms at the bottom of the crucible or other vessel. It is to be understood that a series of the heaters and driers can be arranged so that the fully-dried charge from each receptacle can be fed into the crucible or other vessel in succession, the crucible being provided with holes for tapping and being emptied after the contents of a heater and drier have been processed or treated for the reduction required, and when emptied the mixture or contents of another heater and drier can be emptied or passed into the crucible or other vessel.

The preparatory treatment of heating and drying the charge before the reaction takes place avoids all danger of explosion, and consequently injury and loss, enables a powdered or granuled aluminium and a metallic oxid to be effectually mixed and treated with all of the moisture removed, and the process of preparatory treatment of the charge before reaction results in a production of a more perfect and uniform resultant to be obtained.

The reduction of manganese oxids in the form of powder or granules can be practically attained with material which will pass through an eight-mesh sieve; but for the reduction of titanium oxid in a form of powder or granules the material should pass through a one-hundred-and-twenty-mesh sieve for obtaining the best resultants, and the mesh of sieves to suit the various metallic oxids and the oxids of the metalloids—boron and silicon—should range between these two extremes of eight and one hundred and twenty for giving the best reaction and the most perfect results. This preparatory heating and drying to remove all the moisture has been successfully applied by me with metallic oxids and oxids of metalloids having one metal as the base and also with oxids having two metals as the base, and in both cases the result has been the reduction of the oxids, and this is also true with the sulfids as the chemico-physical law that each metal and chemical molecule has a definite latent heat of stability is effective and acts with metallic oxids and the oxids of metalloids, so as to dissociate the component atoms and to form new molecules. It enables charges composed of metallic oxids of iron and scheelite in combination with metallic aluminium to be dissociated and the new molecules—lime, corundum, and ferro-tungsten-boron—are formed. This reaction takes place according to the following chemical equation: $24Al + 6Fe_2O_3 + 2CaWO_4 + 4B_2O_3 = 12Al_2O_3 + 2CaO + 2(Fe_6WB_4)$, mennaccanite $(FeTi)_2O_3 - Fe_2O_3$ is dissociated and the new molecule $(Fe_6Ti_3:B_6)$ is formed. Other complex oxid molecules, like huebnerite $MnWO_4$, are also dissociated and form new definite crystalline molecules of complex composition. Metallic sulfids in combination with oxids also react perfectly. They are dissociated and new complex molecules formed. Using molybdenite $MoS_2$ in connection with $Fe_2O_3$ and $B_2O_3$ the molecule ferro-molybdenum-borid is formed $Fe_{12}B_6Mo_3$, as shown by the equation: $22Al + 6Fe_2O_3 - 3(MoS_2) + 3(B_2O_3) = 2(Al_2S_3) + Fe_{12}Mo_3B_6 + 9(Al_2O_3)$. These compounds are not alloys—that is, mixtures of metals—but are true chemical molecules having definite composition and definite crystalline structure, and the reduction of the oxids of these metals and metalloids to form the compounds above named is a feature of the process of the present invention.

It will be seen that with the employment of the drying-out of a charge, so as to positively remove all hygroscopic or ordinarily present moisture therefrom, an almost endless number of metals, metalloids, alloys, and compounds can be obtained and that the process will result in making each charge of a definite composition and have the charge in its entirety composed of the contents of the chamber of the inner box or casing with the result of accurate and perfect treatment in the reduction of the oxids, whether of metal or metalloids or whether having a base of one metal or a base of two metals, thus assuring the reduction of metallic oxids and metalloids in a perfect manner and under conditions that will enable the production of the desired metal, alloys, and compounds to be made commercially practical.

What I regard as new, and desire to secure by Letters Patent, is—

1. The method of treating metallic oxids with aluminium in the production of metals and metalloids and alloys and their compounds, which consists in subjecting the to-be-treated charge comprising aluminium in admixture with a metallic oxid reducible by aluminium to a drying by heat for removing the hygroscopic or ordinarily present moisture in a treatment preparatory to reduction, substantially as described.

2. The method of treating metallic oxids with aluminium in the production of metals and alloys which consists in subjecting the to-be-treated charge comprising aluminium in admixture with a metallic oxid reducible by aluminium to a drying by steam heat for removal of the hygroscopic or ordinarily present moisture as a treatment preparatory to reduction, substantially as described.

3. The method of treating metallic oxids with aluminium in the production of metals and alloys which consists in subjecting the to-be-treated charge comprising aluminium in admixture with a metallic oxid reducible by aluminium both the aluminium and metallic oxid in the condition of a fine powder or granule to a drying by steam heat for removal of the hygroscopic or ordinarily present moisture as a treatment preparatory to reduction, substantially as described.

4. The method of treating metallic oxids with aluminium in the production of metals and metalloids, which consists in subjecting the to-be-treated charge comprising aluminium in admixture with a metallic oxid reducible by aluminium, to a drying by heat for removing the hygroscopic or ordinarily present moisture and dissociating the oxid and sulfid molecules from the to-be-treated charge in one operation as a treatment preparatory to reduction, substantially as described.

FREDERICK C. WEBER.

Witnesses:
FREDERICK J. G. MULLER,
MAGGIE BOYLAN.